(12) United States Patent
Thomas et al.

(10) Patent No.: US 11,174,743 B2
(45) Date of Patent: Nov. 16, 2021

(54) TURBINE SHROUD ASSEMBLY WITH MULTI-PIECE SUPPORT FOR CERAMIC MATRIX COMPOSITE MATERIAL SEAL SEGMENTS

(71) Applicant: Rolls-Royce Corporation, Indianapolis, IN (US)

(72) Inventors: David J. Thomas, Brownsburg, IN (US); Jeffrey A. Walston, Indianapolis, IN (US); Aaron D. Sippel, Zionsville, IN (US); Daniel K. Vetters, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 40 days.

(21) Appl. No.: 16/723,183

(22) Filed: Dec. 20, 2019

(65) Prior Publication Data
US 2021/0189894 A1    Jun. 24, 2021

(51) Int. Cl.
*F01D 5/32*    (2006.01)
*F01D 5/30*    (2006.01)

(52) U.S. Cl.
CPC .......... *F01D 5/326* (2013.01); *F01D 5/3084* (2013.01); *F01D 5/3092* (2013.01)

(58) Field of Classification Search
CPC ...... F01D 11/003; F01D 11/10; F01D 11/005; F01D 9/02; F01D 9/04; F01D 5/326; F01D 5/3084; F01D 5/3092
See application file for complete search history.

(56) References Cited

U.S. PATENT DOCUMENTS

| | | | |
|---|---|---|---|
| 4,529,355 A * | 7/1985 | Wilkinson | F01D 9/04 415/173.1 |
| 8,647,055 B2 | 2/2014 | Foster et al. | |
| 8,740,552 B2 | 6/2014 | Marusko et al. | |
| 8,753,073 B2 | 6/2014 | Albers et al. | |
| 8,790,067 B2 | 7/2014 | McCaffrey et al. | |
| 8,834,105 B2 | 9/2014 | Albers et al. | |
| 8,905,709 B2 | 12/2014 | Dziech et al. | |
| 9,127,569 B2 | 9/2015 | Akiyama et al. | |
| 9,175,579 B2 | 11/2015 | Franks et al. | |
| 9,726,043 B2 | 8/2017 | Franks et al. | |
| 10,087,784 B2 | 10/2018 | Shapiro et al. | |
| 10,094,234 B2 * | 10/2018 | O'Leary | F01D 11/10 |
| 10,196,919 B2 * | 2/2019 | O'Leary | F01D 11/001 |
| 10,577,977 B2 * | 3/2020 | Baucco | F01D 11/005 |
| 10,746,037 B2 * | 8/2020 | Sippel | F01D 9/04 |
| 2012/0082540 A1 * | 4/2012 | Dziech | F01D 11/005 415/173.1 |
| 2014/0023490 A1 * | 1/2014 | Hillier | F01D 11/005 415/173.6 |
| 2016/0097303 A1 | 4/2016 | Baldiga et al. | |
| 2016/0333715 A1 | 11/2016 | McCaffrey | |
| 2017/0101882 A1 * | 4/2017 | Sippel | F01D 11/005 |

(Continued)

*Primary Examiner* — Justin D Seabe
*Assistant Examiner* — Ryan C Clark
(74) *Attorney, Agent, or Firm* — Barnes & Thornburg LLP

(57) ABSTRACT

An assembly adapted for use in a gas turbine engine or other engine has a carrier component and a blade track segment. The assembly includes a mounting system for coupling the blade track segment to the carrier component. In an illustrative embodiment, the assembly is a turbine shroud segment for blocking gasses from passing over turbine blades included in the gas turbine engine.

20 Claims, 3 Drawing Sheets

(56) References Cited

U.S. PATENT DOCUMENTS

| | | |
|---|---|---|
| 2017/0130600 A1 | 5/2017 | Shapiro et al. |
| 2017/0145847 A1* | 5/2017 | Zhang .................. F01D 11/003 |
| 2017/0298753 A1* | 10/2017 | O'Leary .................. F01D 9/02 |
| 2018/0106160 A1 | 4/2018 | Thomas et al. |
| 2018/0149030 A1 | 5/2018 | Freeman et al. |
| 2018/0149041 A1 | 5/2018 | Freeman et al. |
| 2018/0149042 A1* | 5/2018 | Freeman .............. F01D 11/005 |
| 2018/0298773 A1* | 10/2018 | Vetters ................. F01D 11/005 |
| 2019/0107001 A1 | 4/2019 | Crutchfield |
| 2019/0107002 A1 | 4/2019 | Crutchfield |

\* cited by examiner

TURBINE SHROUD ASSEMBLY WITH MULTI-PIECE SUPPORT FOR CERAMIC MATRIX COMPOSITE MATERIAL SEAL SEGMENTS

FIELD OF THE DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional fasteners such as rivets or bolts may present problems due to thermal expansion and/or material properties of the ceramic matrix composite components.

SUMMARY

The present disclosure may comprise one or more of the following features and combinations thereof.

A turbine shroud segment adapted for use in a gas turbine engine may include a carrier segment, a blade track segment, and a mounting system. The carrier segment may comprise metallic materials. The blade track segment may comprise ceramic matrix composite materials. The mounting system may be configured to couple the blade track segment to the carrier segment.

In some embodiments, the blade track segment may be formed to include a runner and an attachment. The runner may be shaped to extend partway around a central axis. The attachment may extend radially outward from the runner.

In some embodiments, the mounting system may include a brace and retaining nuts. The brace may include a bracket and a plurality of shafts. The bracket may engage the attachment portion of the blade track segment. The plurality of shafts may extend from the bracket through the carrier segment into engagement with the retaining nuts to couple the blade track segment to the carrier segment.

In some embodiments, the carrier segment may include a plurality of locating pads. The locating pads may each extend radially inwardly through corresponding radially-opening apertures in the brace to directly contact the blade track segment and radially locate the blade track segment relative to the brace.

In some embodiments, the locating pads may all spaced circumferentially from one another about the central axis. In some embodiments, at least one locating pad may be spaced axially from another locating pad along the central axis. In some embodiments, the plurality of locating pads may include at least three locating pads.

In some embodiments, the bracket may include a first track-location arm, a second track-location arm, and a reaction panel. The first track-location arm may engage the attachment portion of the blade track segment. The second track-location arm may engage the attachment portion of the blade track segment opposite the first track-location arm. The reaction panel may be arranged radially outward of the blade track segment and interconnect the first track-location arm and the second track-location arm.

In some embodiments, the reaction panel may interconnect the first and second track-location arms to provide a load path for opposed moment loading applied to the first track-location arm and the second track-location arm by forces urging the blade track segment radially inward during use of the turbine shroud segment in the gas turbine engine. In some embodiments, the first track-location arm, the second track-location arm, and the reaction panel may cooperate to form a C-shape when viewed in cross-section about the central axis.

In some embodiments, each of the first track-location arm and the second track-location arm may include an axial-stop panel and a radial-stop panel. The axial-stop panel may extend radially-inwardly from the reaction panel. The radial-stop panel may extend axially from the corresponding axial-stop panel at a location spaced apart from the reaction panel.

In some embodiments, each of the first track-location arm and the second track-location arm may further include at least one engagement pad. The engagement pad may extend radially outward from the radial-stop panel and engage the attachment portion of the blade track segment.

In some embodiments, the radially-opening apertures may extend radially through the reaction panel of the bracket. The radially-opening apertures may be located on one of a fore side and an aft side of the bracket so that the shafts provide a centered attachment to the carrier segment.

In some embodiments, the attachment portion of the blade track segment may have a T-shape when viewed in the circumferential direction. The attachment portion may include a stem and an attachment panel. The stem may extend radially outward from the runner. The attachment panel may extend axially forward and aft from the stem such that the entire blade track segment has a generally I-beam shape when viewed in the circumferential direction.

According to another aspect of the present disclosure, a turbine shroud segment adapted for use in a gas turbine engine may include a carrier segment, a blade track segment, and a mounting system. The blade track segment may be formed to include a runner shaped to extend partway around a central axis and an attachment portion that extends radially outward from the runner. The mounting system may be configured to couple the blade track segment to the carrier segment.

In some embodiments, the mounting system may include a brace having a bracket and a plurality of shafts. The bracket may engage the attachment portion of the blade track segment. The plurality of shafts may extend from the bracket through the carrier segment to couple the blade track segment to the carrier segment.

In some embodiments, the carrier segment may include a plurality of locating pads. The locating pads may extend radially inwardly through radially-opening apertures in the brace to directly contact the blade track segment and radially located the blade track segment relative to the brace.

In some embodiments, the locating pads may be all spaced circumferentially from one another about the central axis. In some embodiments, at least one locating pad may be spaced axially from another locating pad along the central axis. In some embodiments, the plurality of locating pads may include at least three locating pads.

In some embodiments, the bracket may include a first track-location, a second track-location arm, and a reaction panel. The first track-location arm may engage the attachment portion of the blade track segment. The second track-location arm may engage the attachment portion of the blade track segment opposite the first track-location arm. The reaction panel may be arranged radially outward of the blade track segment.

In some embodiments, the reaction panel may interconnect the first track-location arm and the second track-location arm. The reaction panel may interconnect the first and second track-location arms to provide a load path for opposed moment loading applied to the first track-location arm and the second track-location arm by forces urging the blade track segment radially inward during use of the turbine shroud segment in the gas turbine engine.

In some embodiments, the first track-location arm and the second track-location arm may each include an axial-stop panel, a radial-stop panel, and at least one engagement pad. The axial-stop panel may extend radially-inwardly from the reaction panel. The radial-stop panel may extend axially from the corresponding axial-stop panel at a location spaced apart from the reaction panel. The at least one engagement pad may extend radially away from the radial-stop panel and engage the attachment portion opposite one locating pad of the plurality of locating pads.

In some embodiments, the attachment portion of the blade track segment may have a T-shape when viewed in the circumferential direction. The attachment portion may include a stem and an attachment panel. The stem may extend radially outward from the runner. The attachment panel may extend axially forward and aft from the stem such that the entire blade track segment has a generally I-beam shape when viewed in the circumferential direction.

According to another aspect of the present disclosure, a method may include providing a carrier segment, a blade track segment, and a mounting system. The mounting system may be configured to couple the blade track segment to the carrier segment.

In some embodiments, the blade track segment may include a runner and an attachment portion. The runner may be shaped to extend partway around a central axis. The attachment portion may extend radially outward from the runner.

In some embodiments, the mounting system may include retaining nuts and a brace. The brace may having a bracket and a plurality of shafts. The plurality of shaft may extend radially from the bracket.

In some embodiments, the method may further include arranging the attachment portion of the blade track segment in an attachment portion receiving space formed in the bracket of the mounting system and inserting each of the shafts through holes formed in the carrier. The method may further include coupling each of the retaining nuts to the corresponding shaft and tightening each of the retaining nuts to extend locating pads formed in the carrier segment through radially-opening apertures in the brace so that the locating pads engage the attachment portion of the blade track segment.

In some embodiments, the bracket may include a first track-location arm, a second track-location arm, and a reaction panel. The first track-location arm may engage the attachment portion of the blade track segment. The second track-location arm may engage the attachment portion of the blade track segment opposite the first track-location arm. The reaction panel may be arranged radially outward of the blade track segment and may extend between and interconnect the first track-location arm and the second track-location arm.

In some embodiments, the first track-location arm and the second track-location arm may each include an axial-stop panel, a radial-stop panel, and at least one engagement pad. The axial-stop panel may extend radially-inwardly from the reaction panel. The radial-stop panel may extend axially from the corresponding axial-stop panel at a location spaced apart from the reaction panel. The least one engagement pad may extend radially away from the radial-stop panel and engage the attachment portion opposite one locating pad of the plurality of locating pads.

These and other features of the present disclosure will become more apparent from the following description of the illustrative embodiments.

DETAILED DESCRIPTION OF THE DRAWINGS

Figure 1:
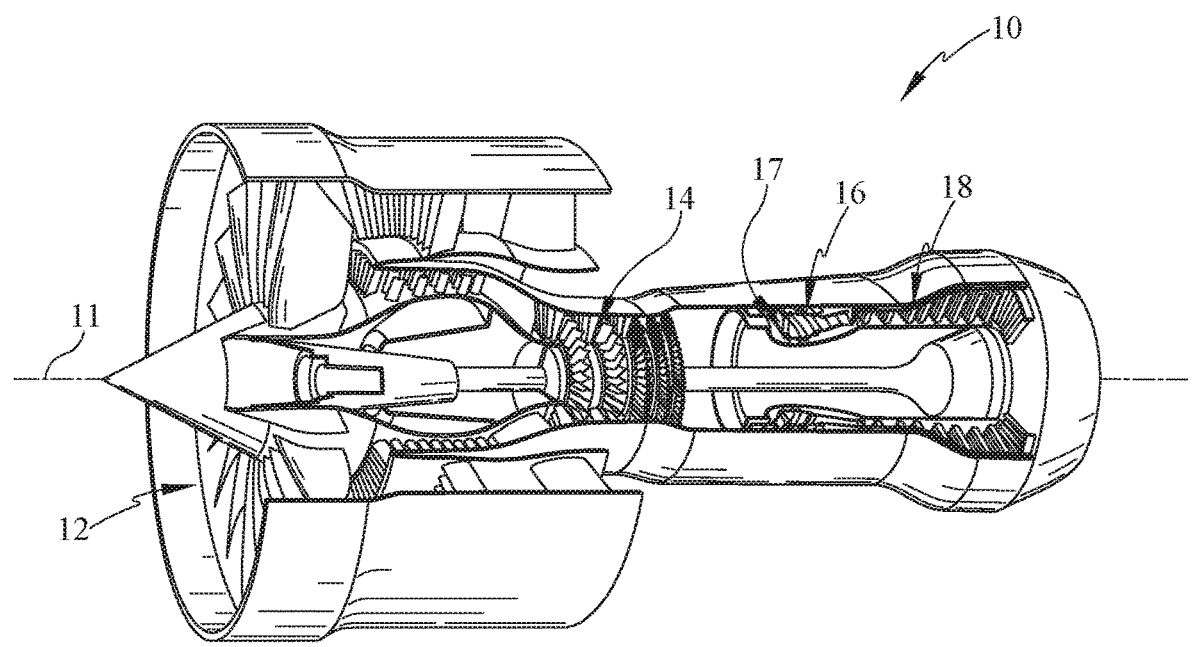
FIG. 1 is a cut-away perspective view of a gas turbine engine showing that the exemplary engine includes a fan driven by an engine core having a compressor, a combustor, and a turbine.

For the purposes of promoting an understanding of the principles of the disclosure, reference will now be made to a number of illustrative embodiments illustrated in the drawings and specific language will be used to describe the same.

Figure 2:
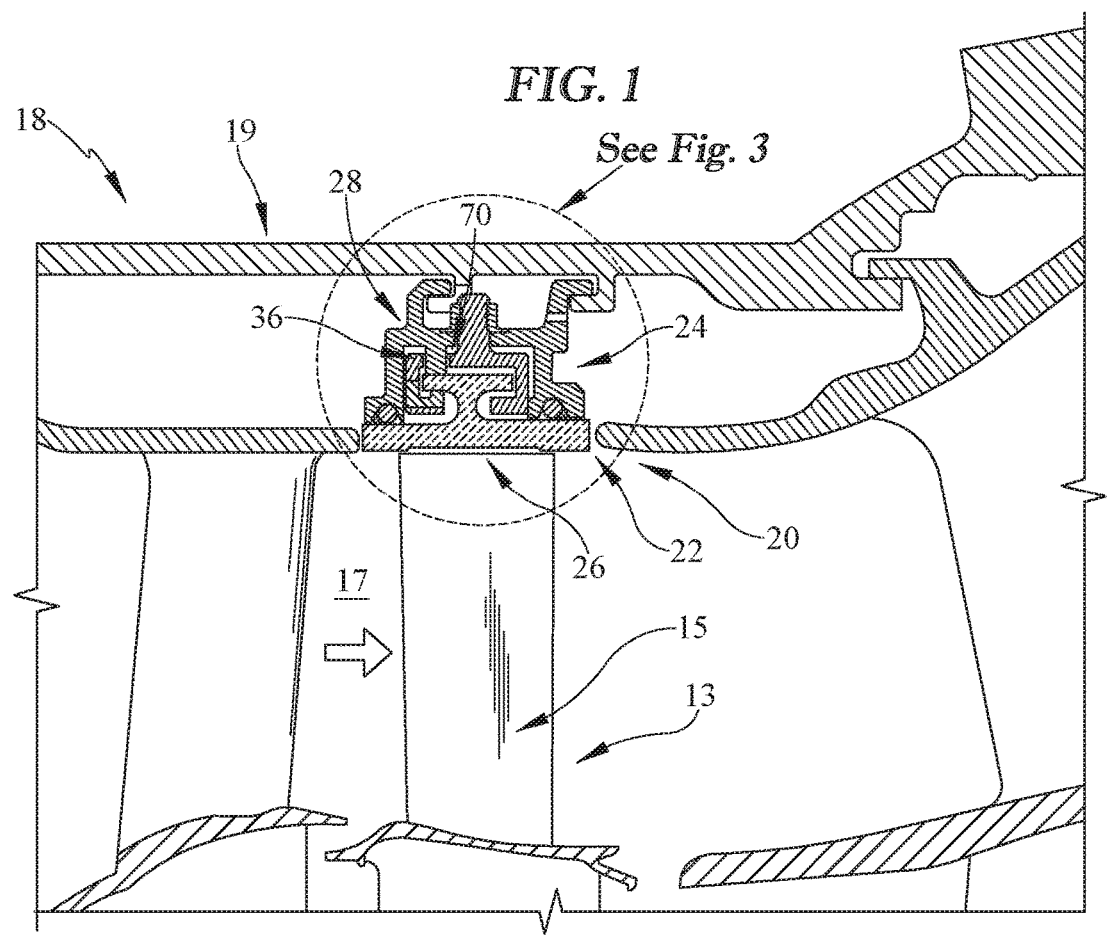
FIG. 2 is a partial cross-sectional view of the gas turbine engine of FIG. 1 showing the arrangement of a segmented turbine shroud radially outward from blades of a turbine wheel assembly to suggest that the turbine shroud blocks gasses from passing over the blades without interacting with the blades.
Figure 3:
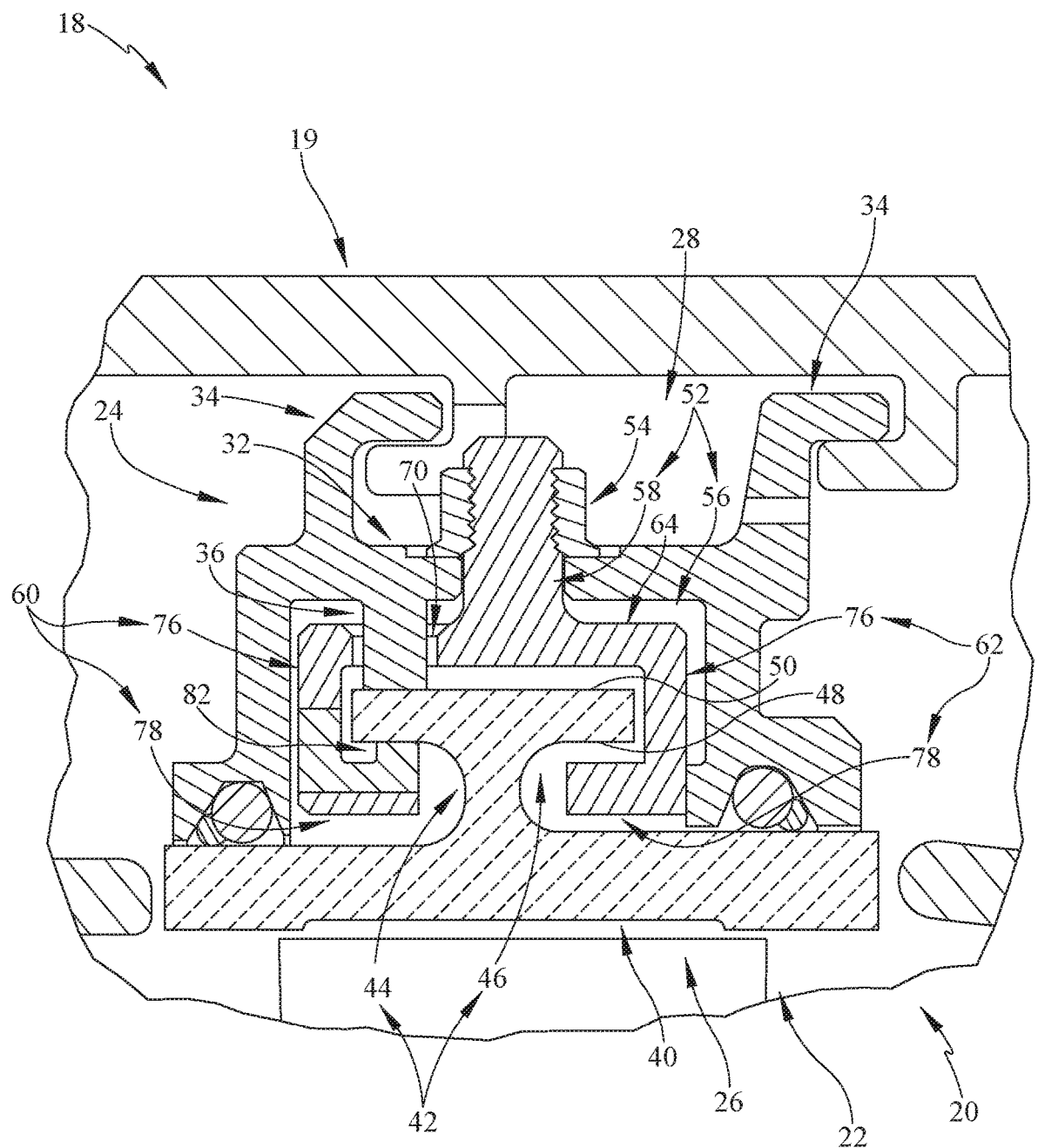
FIG. 3 is a detail view of a portion of FIG. 2 showing a turbine shroud segment that includes a carrier segment, a blade track segment made from ceramic matrix composite materials, and a mounting system for coupling the blade track segment to the carrier segment, and showing that the mounting system is provided by a multi-piece support for holding the blade track segment relative to the case.
Figure 4:
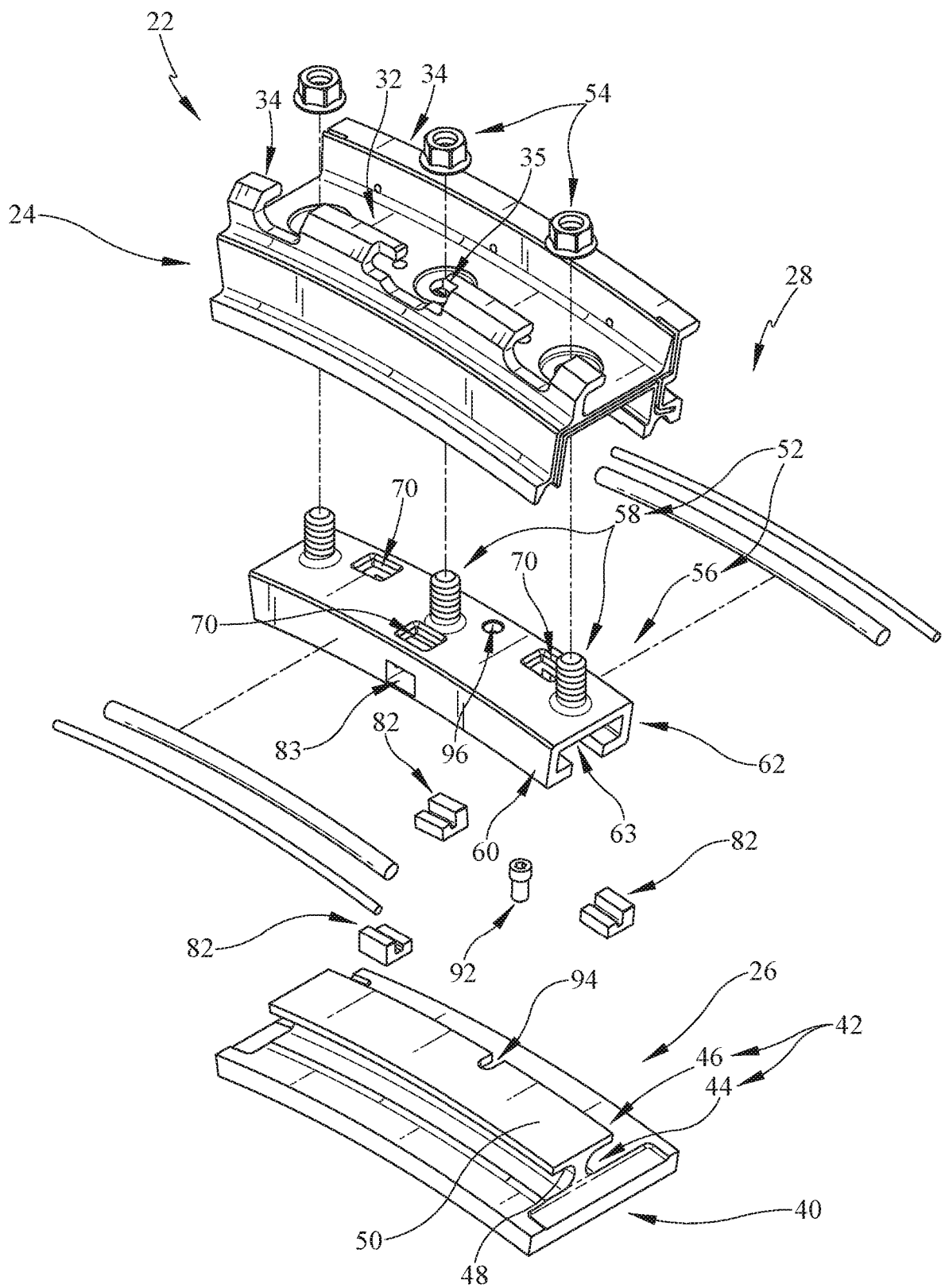
FIG. 4 is an exploded perspective assembly view of the turbine shroud segment in FIG. 3 showing that the turbine shroud segment includes—generally from top to bottom—a carrier, a brace, and the blade track segment.

A turbine shroud 20 adapted for use in a gas turbine engine 10 is shown in FIGS. 2-4. The turbine shroud 20 includes a carrier segment 24, a blade track segment 26, and a mounting system 28 configured to couple the blade track segment 26 to the carrier segment 24 as shown in FIGS. 3 and 4. The carrier segment 24 is a metallic support component configured to interface with other metallic components of the gas turbine engine 10. The blade track segment 26 is a ceramic matrix composite component configured to directly face the high temperatures of a primary gas path 17 of the gas turbine engine 10. The mounting system 28 is designed to engage the blade track segment 26 so as to couple the blade track segment 26 to the carrier segment 24 and distribute mounting and pressure loads.

The mounting system 28 includes a brace 52 along with corresponding nuts 54 as shown in FIGS. 3 and 4. The brace 52 is configured to distribute coupling and pressure loads applied to the blade track segment 26. The nuts 54 are threaded in the illustrative embodiment and engage the brace 52 to fix the brace 52 in place and to apply coupling load to the blade track segment 26 through the brace 52. Adjustable attachment arrangements, such as a bolted hanger system, may help accommodate the poor surface tolerance of the "as formed" blade track segment 26.

The brace 52 of the mounting system 28 is shaped to include radially-opening apertures 70 as shown in FIGS. 2-4. The apertures 70 each receive a corresponding locating pad 36 formed in the carrier segment 24 as shown in FIGS. 2-4. The locating pads 36 directly contact the blade track segment 26 to radially locate the blade track segment 26. The "nesting" arrangement of the locating pads 36 in the apertures 70 may reduce the radial space claim of the turbine shroud 20, while also allowing the load path to be centered on the carrier segment 24. This in turn may reduce and/or eliminate the rigid body motion of the turbine shroud 20.

Turning again to the gas turbine engine, the illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

The turbine 18 includes at least one turbine wheel assembly 13 and the turbine shroud 20 positioned to surround the turbine wheel assembly 13 as shown in FIGS. 1 and 2. The turbine shroud 20 is coupled to an outer case 19 of the gas turbine engine 10. The turbine wheel assembly 13 includes a plurality of blades 15 coupled to a rotor disk for rotation therewith. The hot, high pressure combustion products from the combustor 16 are directed toward the blades 15 of the turbine wheel assemblies 13 along the gas path 17. The blades 15 are in turn pushed by the combustion products to cause the turbine wheel assembly 13 to rotate; thereby, driving the rotating components of the compressor 14 and/or the fan 12.

The turbine shroud 20 extends around the turbine wheel assembly 13 to block combustion products from passing over the blades 15 without pushing the blades 15 to rotate as suggested in FIG. 2. In the illustrative embodiment, the turbine shroud 20 is made up of a number of shroud segments 22, one of which is shown in FIGS. 3 and 4, that extend only part-way around the central axis 11 and cooperate to surround the turbine wheel assembly 13. The shroud segments 22 are sealed against one another, such as by strip seal members, to provide a continuous turbine shroud 20.

Each shroud segment 22 includes the carrier segment 24, the blade track segment 26, and the mounting system 28 as shown in FIGS. 3 and 4. In other embodiments, the turbine shroud 20 is annular and non-segmented to extend fully around the central axis 11 and surround the turbine wheel assembly 13. In yet other embodiments, certain components of the turbine shroud 20 are segmented while other components are annular and non-segmented.

The carrier segment 24 included in each shroud segment 22 is coupled to the case 19 of the engine 10 as shown in FIG. 2. Each carrier segment 24 illustratively includes a body plate 32, hangers 34, and locating pads 36 as shown in FIG. 3. The body plate 32 extends partway around the axis 11 and is formed to include holes 35 through which the mounting system 28 extends. The hangers 34 extend radially outward from the body plate 32 and engage the case 19 to couple the turbine shroud segment 22 to the rest of the engine 10. Three locating pads 36 extend radially inward from the body plate 32 through the apertures 70 in the brace 52 and contact the blade track segment 26 to help locate the blade track segment 26 relative to the carrier segment 24. The locating pads 36 may be machined to help place the blade track segment 26 in a desired orientation relative to the carrier segment 24.

The blade tracks segment 26 of each shroud segment 22 comprises ceramic matrix composite materials as suggested in FIGS. 2 and 4. The blade track segment 26 is held in place adjacent to tips of blades 15 to block combustion products from passing over the blades 15 without pushing the blades 15 to rotate as suggested in FIG. 2. The blade track segment 26 is illustratively formed to include a runner 40 and an attachment portion 42. The runner 40 arcuate and extends partway around axis 11 adjacent to blades 15. The attachment portion 42 extends radially outward from the runner 40 to provide structure for coupling the blade track segment 26 to the carrier segment 24.

In the illustrative embodiment, the attachment portion 42 of the blade track segment 26 has a T-shape when viewed in the circumferential direction as such that the entire blade track segment has a generally I-beam shape when viewed in the circumferential direction shown in FIGS. 3 and 4. The attachment portion (or attachment) 42 includes a stem 44 that extends radially outward from the runner 40 and an attachment panel 46 that extends radially forward and aft from the stem 44. In other embodiments, the attachment 42 may be provided by L-shaped hangers, fir-tree shaped members, dovetail members, box shape panels, or other suitable features.

Turning again to the mounting system 28, the brace 52 includes a bracket 56 and a plurality of shafts 58 as shown in FIGS. 3 and 4. The bracket 56 engages the blade track segment 26 and the carrier segment 24 to locate and distribute mounting/pressure loads. Each shaft 58 of each brace 52 extends from the bracket 56 through the carrier segment 24 into a corresponding nut 54. In the illustrative embodiment, the plurality of shafts 58 are threaded and mate with threads of the retaining nuts 54. In other embodiments, the shafts 58 may not be threaded and may instead be engaged by a C-ring to couple the brace 52 to the carrier segment 24.

The bracket 56 includes opposed track-location arms 60, 62 and a reaction panel 64 that interconnects the opposed location arms as shown in FIGS. 3 and 4. The first track-location arm 60 engages the attachment 42 of the blade track segment 26. The second track-location arm 62 engages the attachment 42 of the blade track segment 26 opposite the first track-location arm. The reaction panel 64 provides a load path for opposed moment loading applied to the first track-location arm 60 and the second track-location arm 62 by forces urging the blade track segment 26 radially inward during use of the turbine shroud segment 22 in the gas turbine engine 10.

In the illustrated embodiment, the first track-location arm 60 is located primarily forward of the attachment 42 included in the blade track segment 26 and the second track-location arm 62 is located primarily aft of the attachment 42 included in the blade track segment 26 as shown in FIG. 3. The reaction panel 64 extends axially between the first and the second track-location arms 60, 62 at a point radially outward of the attachment 42. In other embodiments, the track-location arms 60, 62 may be arranged primarily on circumferentially different sides of the attachment 42 and the reaction panel may extend circumferentially across the attachment 42.

In view of this, the first track-location arm 60, the second track-location arm 62, and the reaction panel 64 cooperate to form a C-shape when viewed in cross-section around the axis 11. The C-shape of the bracket 56 defines an attachment receiving space 63 that receives the attachment panel 46 of the blade track segment 26.

In the illustrative embodiment, the reaction panel 64 is shaped to include the radially-opening apertures 70. The radially-opening apertures 70 are located axially forward and aft of the shaft 58. In this way, the threaded shaft 58 extends radially outward from the center of the brace 52. In the illustrative embodiment, the locating pads 36 extend through the radially-opening apertures 70 and into contact with a radially-outwardly facing surface 50 of the attachment panel 46 included in the blade track segment 26 to radially locate the blade track segment 26.

Each of the exemplary first track-location arm 60 and the second track-location arm 62 include an axial-stop panel 76 and a radial-stop panel 78 as shown in FIGS. 3 and 6. The axial-stop panels 76 are arranged to block axial movement of the brace 52 and to axially locate the blade track segment 26. The axial-stop panel 76 extends radially-inwardly from the reaction panel 64 and the radial-stop panel 78 extends axially from the corresponding axial-stop panel 76 at a location spaced apart from the reaction panel 64. Thus, each track-location arm 60, 62 forms an L-shape when viewed in cross-section around the axis 11.

Each track-location arm 60, 62 also include at least one engagement pad 82 as shown in FIGS. 3 and 5. The engagement pad 82 extends radially-outwardly from a corresponding radial-stop panel 78 and into contact with a radially-inwardly facing surface 48 of the attachment panel 46 of the attachment 42 included in the blade track segment 26. Each engagement pad 82 and is radially aligned with a corresponding locating pad in the illustrative embodiment.

In the illustrative embodiment, the engagement pad 82 is a separate insert that is arranged in a slot 83 formed in the corresponding track-location arm 60, 62. Each engagement pad insert 82 extends to and engages the radially-inwardly facing surface 48 of the attachment panel 46 of the attachment 42 included in the blade track segment 26. In other embodiments, the engagement pad 82 is integrally formed with the axial-stop panel 76 and the radial-stop panel 78 such that the track-location arms 60, 62 are a single, integral component.

In the illustrative embodiment, the first track-location arm 60 includes only one engagement pad 82 and the second track-location arm 62 includes two engagement pads 82 so that the bracket 56 included in a brace 52 has three points of contact with the blade track segment 26. In other embodiments, the first track-location arm 60 includes two engagement pads 82 and the second track-location arm 62 includes only one engagement pads 82. In some embodiments, each of the first track-location arm 60 and the second track-location arm 62 each include more than one engagement pad 82.

In the illustrative embodiment, the turbine shroud segment 22 further includes an anti-rotation feature having a pin 92, an anti-rotation slot 94, and an anti-rotation pin hole 96 as shown in FIG. 4. The anti-rotation slot 94 is formed in the attachment panel 46 of the blade track segment 26 and aligns with the anti-rotation pin hole 96 formed in the bracket 56 of the brace 52. The pin 92 extends through the pin hole 96 and into the slot 94 to block circumferential movement of the blade track segment 26 relative to the brace 52.

A method of assembling the turbine shroud 20 may include several steps. The method includes arranging the attachment 42 of the blade track segment 26 in the attachment-receiving space formed in the brace 52. Once the attachment 42 is in place, the method further includes arranging the engagement pads 82 within the slots formed in the track-location arms 60, 62 so that the engagement pads 82 contact the radially-inwardly facing surface of the attachment panel 46.

After the brace 52 and blade track segment 26 are assembled together, the method continues by coupling the brace 52 to the carrier segment 24. The coupling step includes arranging the shafts 58 through the corresponding holes 35 in the carrier segment 24 and mating the threaded retaining nuts 54 with the threaded shafts 58. The threaded retaining nuts 54 are then tightened so that the locating pads 36 extend through the radially-opening apertures and contact the radially-outwardly facing surface of the attachment panel 46. In other embodiments, the nuts 54 may be another type of fasteners that are mated with the shafts 58 to couple the brace 52 with the carrier segment 24.

Adjustable attachments, such as a bolted hanger system, are herein considered to help accommodate the poor (relative to more conventional turbine engine materials/fabrication processes) surface tolerance of the "as formed" ceramic matrix composite part can have on impacted interfaces in the design stack. Using this technique, control of the final placement of the part is transferred from the poorly controlled surface in a hard to reach area (such as the underside of a hanger) to a more accessible area that can be machined to a more tightly controlled tolerance (such as the outer surface of the same hanger).

As such, the present disclosure teaches a "nesting" arrangement, wherein the carrier segment 24 nests or extends through a portion of the mounting system 28 to engage the blade track segment 26. The nesting arrangement of the carrier segment 24 and the mounting system 28 allows the load path to be centered on the carrier segment 24, avoiding the unwanted rigid body motion, while at the same time minimizing the vertical space claim requirement.

Another problem that may be experienced with some hanger attachment arrangements that utilize "hooks" that reach under the attachment of the blade track segment 26 is that a resulting bending moment is applied to the hook. The resulting bending moment may tip the hook and nut, resulting in undesired motion and potentially with an open leak path under the nut face. By combining the reach under features on both sides into a single piece or brace 52, the bending moments may cancel out, eliminating or at least greatly reducing this issue.

In the illustrative embodiments, the bracket 56 extends partway about the axis 11 and only one row of shafts 58 that mate with corresponding nuts 54 on the top face of the carrier segment 24. Unlike, previous hook or hanger arrangements that may use multiple hooks or hangers, the single row of threaded shafts 58 provides more axial space claim for optimizing the placement of the case 19 to carrier hangers 34. The single row of shafts 58 may also enable this type of attachment scheme to scale down to much smaller engine sizes.

Embodiments presented herein may also take advantage of modularity to provide engagement pads 82 (sometimes called load pads), as well as the bridging of the supports via reaction panel 64 to reduce the unwanted rigid body motion. Moreover, designs in accordance with the present disclosure can create a centered load path with opposing moments to help reduce the tendency of the part to rock.

Concepts in accordance with this disclosure can provide flexibility during assembly. With the modular design of this disclosure, all of the shafts 58 can be assembled with a true radial orientation. The embodiments shown with an I-Beam shaped blade track segment 26 can provide some desired failure characteristics; such as, in the event of a failed post, the bracket 56 itself remains captured by the top flange of the I-Beam and does not move around unconstrained on the backside of the CMC flow path.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment adapted for use in a gas turbine engine, the turbine shroud segment comprising
    a carrier segment comprising metallic materials,
    a blade track segment comprising ceramic matrix composite materials, the blade track segment formed to include a runner shaped to extend partway around a central axis and an attachment that extends radially outward from the runner, and
    a mounting system configured to couple the blade track segment to the carrier segment, the mounting system including a brace and retaining nuts, wherein the brace includes a bracket that engages the attachment portion of the blade track segment and a plurality of shafts that extend from the bracket through the carrier segment into engagement with the retaining nuts to couple the blade track segment to the carrier segment,
    wherein the carrier segment includes a body plate that extends at least partway about the central axis and a plurality of locating pads that each extend radially inwardly from the body plate through corresponding radially-opening apertures formed in the brace to directly contact a radially-outwardly facing surface of the blade track segment and radially locate the blade track segment relative to the brace.

2. The turbine shroud segment of claim 1, wherein the locating pads are all spaced circumferentially from one another about the central axis.

3. The turbine shroud segment of claim 2, wherein at least one locating pad is spaced axially from another locating pad along the central axis.

4. The turbine shroud segment of claim 3, wherein the plurality of locating pads includes at least three locating pads.

5. The turbine shroud segment of claim 1, wherein the bracket includes a first track-location arm that engages the attachment portion of the blade track segment, a second track-location arm that engages the attachment portion of the blade track segment opposite the first track-location arm, and a reaction panel arranged radially outward of the blade track segment that interconnects the first track-location arm and the second track-location arm so as to provide a load path for opposed moment loading applied to the first track-location arm and the second track-location arm by forces urging the blade track segment radially inward during use of the turbine shroud segment in the gas turbine engine.

6. The turbine shroud of claim 5, wherein the first track-location arm, the second track-location arm, and the reaction panel cooperate to form a C-shape when viewed in cross-section about the central axis.

7. The turbines shroud segment of claim 5, wherein each of the first track-location arm and the second track-location arm include an axial-stop panel that extends radially-inwardly from the reaction panel and a radial-stop panel that extends axially from the corresponding axial-stop panel at a location spaced apart from the reaction panel.

8. The turbine shroud segment of claim 7, wherein each of the first track-location arm and the second track-location arm further include at least one engagement pad that extends radially outward from the radial-stop panel and engages the attachment portion of the blade track segment.

9. The turbine shroud assembly of claim 5, wherein the radially-opening apertures extend radially through the reaction panel of the bracket and are located on one of a fore side and an aft side of the bracket so that the shafts provide a centered attachment to the carrier segment.

10. The turbine shroud assembly of claim 1, wherein the attachment portion of the blade track segment has a T-shape when viewed in the circumferential direction with a stem that extends radially outward from the runner and an attachment panel that extends axially forward and aft from the stem such that the entire blade track segment has an I-beam shape when viewed in the circumferential direction.

11. A turbine shroud segment adapted for use in a gas turbine engine, the turbine shroud segment comprising
    a carrier segment,
    a blade track segment, the blade track segment formed to include a runner shaped to extend partway around a central axis and an attachment portion that extends radially outward from the runner, and
    a mounting system configured to couple the blade track segment to the carrier segment, the mounting system including a brace having a bracket that engages the attachment portion of the blade track segment and a plurality of shafts that extend from the bracket through the carrier segment to couple the blade track segment to the carrier segment,
    wherein the carrier segment includes a plurality of locating pads that extend radially inwardly through radially-opening apertures in the brace to directly contact the blade track segment and radially locate the blade track segment relative to the brace.

12. The turbine shroud segment of claim 11, wherein the locating pads are all spaced circumferentially from one another about the central axis.

13. The turbine shroud segment of claim 11, wherein at least one locating pad is spaced axially from another locating pad along the central axis.

14. The turbine shroud segment of claim 11, wherein the plurality of locating pads includes at least three locating pads.

15. The turbine shroud segment of claim 11, wherein the bracket includes a first track-location arm that engages the attachment portion of the blade track segment, a second track-location arm that engages the attachment portion of the blade track segment opposite the first track-location arm, and a reaction panel arranged radially outward of the blade track segment that interconnects the first track-location arm and the second track-location arm so as to provide a load path for opposed moment loading applied to the first track-location arm and the second track-location arm by forces urging the blade track segment radially inward during use of the turbine shroud segment in the gas turbine engine.

16. The turbine shroud of claim 15, wherein the first track-location arm and the second track-location arm each include an axial-stop panel that extends radially-inwardly from the reaction panel, a radial-stop panel that extends axially from the corresponding axial-stop panel at a location spaced apart from the reaction panel, and at least one engagement pad that extends radially away from the radial-stop panel and engages the attachment portion opposite one locating pad of the plurality of locating pads.

17. The turbine shroud of claim 11, wherein the attachment portion of the blade track segment has a T-shape when viewed in the circumferential direction with a stem that extends radially outward from the runner and an attachment panel that extends axially forward and aft from the stem such that the entire blade track segment has an I-beam shape when viewed in the circumferential direction.

18. A method comprising
providing a carrier segment, a blade track segment, and a mounting system configured to couple the blade track segment to the carrier segment, the carrier segment including a body plate that extends at least partway about a central axis and locating pads that each extend radially inwardly from the body plate, the blade track segment including a runner shaped to extend partway around the central axis and an attachment portion that extends radially outward from the runner, and the mounting system including retaining nuts and a brace having a bracket and a plurality of shafts that extend radially from the bracket,
arranging the attachment portion of the blade track segment in an attachment portion receiving space formed in the bracket of the mounting system,
inserting each of the shafts through holes formed in the carrier,
coupling each of the retaining nuts to the corresponding shaft,
tightening each of the retaining nuts to extend the locating pads formed in the carrier segment through radially-opening apertures in the brace so that the locating pads engage a radially-outwardly facing surface of the attachment portion of the blade track segment.

19. The method of claim 18, wherein the bracket includes a first track-location arm that engages the attachment portion of the blade track segment, a second track-location arm that engages the attachment portion of the blade track segment opposite the first track-location arm, and a reaction panel arranged radially outward of the blade track segment that extends between and interconnects the first track-location arm and the second track-location arm.

20. The method of claim 18, wherein the first track-location arm and the second track-location arm each include an axial-stop panel that extends radially-inwardly from the reaction panel, a radial-stop panel that extends axially from the corresponding axial-stop panel at a location spaced apart from the reaction panel, and at least one engagement pad that extends radially away from the radial-stop panel and engages the attachment portion opposite one locating pad of the plurality of locating pads.

* * * * *